No. 674,432. Patented May 21, 1901.
F. W. BREHM.
PHOTOGRAPHIC PLATE HOLDER.
(Application filed Oct. 31, 1900.)
(No Model.)
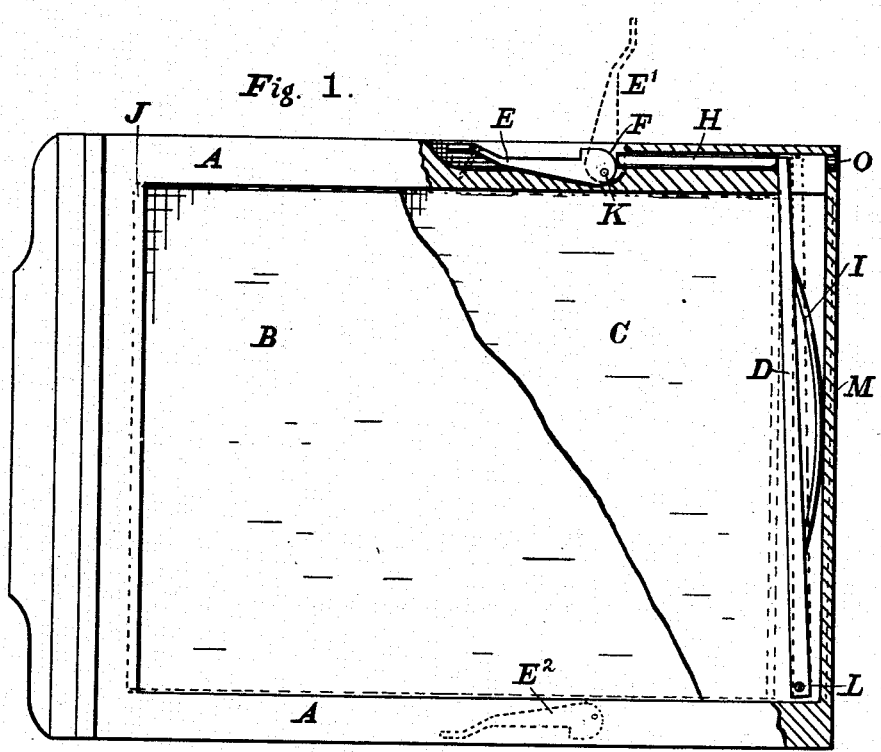
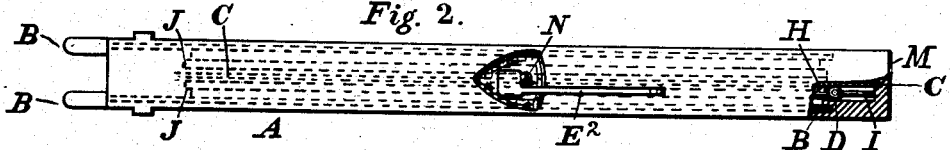
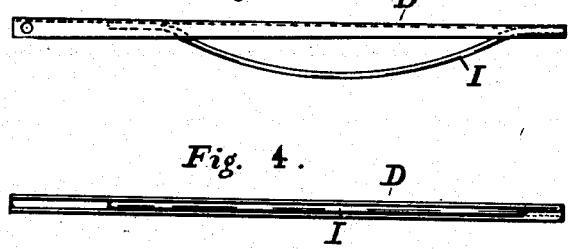
Witnesses
H. R. Selden.
C. G. Cramwell
Inventor
F. W. Brehm,
By Geo. B. Selden,
Attorney
THE NORRIS PETERS CO., PHOTO-LITHO., WASHINGTON, D. C.

UNITED STATES PATENT OFFICE.

FREDERICK WILLIAM BREHM, OF ROCHESTER, NEW YORK, ASSIGNOR TO GUNDLACH OPTICAL COMPANY, OF SAME PLACE.

PHOTOGRAPHIC-PLATE HOLDER.

SPECIFICATION forming part of Letters Patent No. 674,432, dated May 21, 1901.

Application filed October 31, 1900. Serial No. 35,016. (No model.)

*To all whom it may concern:*

Be it known that I, FREDERICK WILLIAM BREHM, a citizen of the United States, residing at Rochester, in the county of Monroe, in the State of New York, have invented certain Improvements in Photographic-Plate Holders, of which the following is a specification, reference being had to the accompanying drawings.

My invention relates to certain improvements in photographic-plate holders designed to facilitate the insertion and removal of the plates and to hold them more securely therein by means of a movable bar operated from the exterior of the holder.

My invention is fully described and illustrated in the following specification and the accompanying drawings, the novel features thereof being specified in the claims annexed to the said specification.

In the accompanying drawings, representing my improvements in plate-holders, Figure 1 is a side view, partially in section. Fig. 2 is an edge view. Figs. 3 and 4 represent the movable bar and spring detached.

My invention is applicable to plate-holders of any required dimensions, either single or double. In the accompanying drawings, showing a double plate-holder, A is the frame; B, the slides; C, the septum; D, the movable bar, which acts against the edge of the plate to hold it in place, and E the lever by which the bar is operated. To insert or remove the plates, the lever E is swung outward, as incated by the dotted lines E' in Fig. 1, in which position the cam F, through the rod H, forces the bar D outward against the spring I, so as to afford room for the plate. When the lever is turned inward and restored to place, the spring I presses the bar D against the edge of the plate and forces its opposite edge under the shoulder J on the frame, so that the plate is securely fastened in the holder. The lever E is pivoted on a pin K, and the bar D is pivoted on a pin or a removable screw L. The bar D and the spring I are located in a recess in the frame-bar M, which recess holds the bar just outside of the septum in position to bear against the edge of the plate. When the bar D is pressed outward, one of the edges of the plate passes under the shoulder on the bar M so far as to allow its opposite edge to clear the shoulder J until the plate is parallel with the septum, after which the spring I forces the bar inward and causes the edge of the plate to pass under the shoulder J. This operation takes place in inserting or removing the plate. The lever E fits into a suitable slot in the frame, its inner end when closed occupying a suitable recess in the edge of the frame and a suitable stud or screw N, Fig. 2, being provided to hold it in its closed and locked position, if desired. The rod H is inserted in a suitable hole bored in the frame and through the frame-bar M, its outer end being closed by the plug O, Fig. 1. Any suitable construction may be adopted for the bar D and spring I. In the drawings the bar is represented as made of a folded strip of sheet metal, with the spring I clamped into it at one end, while the other end is free to slide in the channel of the folded strip. The spring allows the bar to accommodate itself to plates of slightly different length, while holding all securely in the plate-holder. For double plate-holders the lever E for plates on one side of the septum will be out of line with the lever $E^2$, Fig. 2, for plates on the other side of the septum. In either case the end of the lever is shaped so that it can be conveniently operated, and a recess is formed for it in the side of the frame. When the plate is held in the holder, there are no projecting parts.

My improved plate-holder is simple and cheap in construction and is easily worked in the dark room, features which place it in advance of those now in use.

I claim—

1. The combination with a photographic-plate holder, of the plate-retaining device comprising the movable bar extending along one side of the plate and pivoted at one end, the spring for pressing the bar inward, and the pivoted cam-lever arranged to shift the bar outward, as and for the purposes set forth.

2. The combination with a photographic-plate holder, of the plate-retaining device comprising the movable bar extending along one side of the plate and pivoted at one end, the spring for pressing the bar inward, the pivoted cam-lever arranged to shift the bar outward, and the sliding rod between the bar and the cam, as and for the purposes set forth.

3. The combination with a photographic-plate holder, of means for operating a plate-retaining device consisting of the cam-lever pivoted in a slot in the frame and adapted to be concealed therein when folded inward, as and for the purposes set forth.

FREDERICK WILLIAM BREHM.

Witnesses:
   HENRY H. TURNER,
   GEO. B. SELDEN.